United States Patent [19]

Sanner

[11] Patent Number: 4,630,845
[45] Date of Patent: Dec. 23, 1986

[54] AUTHENTICATION DOCUMENT SYSTEM

[75] Inventor: M. Duane Sanner, Irvine, Tex.

[73] Assignee: Light Signatures, Inc., Los Angeles, Calif.

[21] Appl. No.: 526,185

[22] Filed: Aug. 25, 1983

[51] Int. Cl.[4] .................. B42D 15/00; G07D 7/00
[52] U.S. Cl. ................................. 283/91; 283/82; 340/825.34
[58] Field of Search ............ 283/70, 72, 82, 91, 283/904; 235/468, 469, 493, 438; 356/71; 340/825.34

[56] References Cited

U.S. PATENT DOCUMENTS

| | | | |
|---|---|---|---|
| 2,547,838 | 4/1951 | Russell | 283/82 |
| 3,245,697 | 4/1966 | Nugent | 283/82 |
| 3,662,156 | 5/1972 | Grosbard | 283/82 |
| 3,694,285 | 9/1972 | Appel et al. | 283/82 |
| 4,092,526 | 5/1978 | Beck | 283/82 |
| 4,180,207 | 12/1979 | Lee | 283/82 |
| 4,186,944 | 2/1980 | Pearce | 283/82 |
| 4,423,415 | 12/1983 | Goldman | 340/825.34 |

Primary Examiner—Robert L. Spruill
Assistant Examiner—Paul M. Heyrana, Sr.
Attorney, Agent, or Firm—Nilsson, Robbins, Dalgarn, Berliner, Carson & Wurst

[57] ABSTRACT

A system is disclosed including an authentication device as in the form of a document that is difficult to counterfeit and is individually identifiable. A sheet of medium comprising the document incorporates a section with a characteristic that specifically identifies the document as, for example, a section of varying translucency which will modulate a beam of light. Elements of such character identify the document as an individual unit. A visible mark or reference indicia on the document specifies the section of the document that serves to provide the characteristic identification. The visible mark is magnetic and records specific locations in the section and data on the document characteristic at such locations. An associated system is disclosed for producing and testing authenticator devices whereby the characteristic is sensed initially to be magnetically recorded in the mark and subsequently to be compared with the magnetically recorded data.

8 Claims, 5 Drawing Figures

AUTHENTICATION DOCUMENT SYSTEM

BACKGROUND AND SUMMARY OF THE INVENTION

Many types of documents as labels, authentication tags, certificates, and guarantees are used in large quantities and must be processed by machine to achieve reasonable handling costs. Such documents may be encoded with machine-readable data and include a section that exhibits an identifying characteristic. For example, the document might be made of fibrous material, e.g. bond paper, having a varying translucency pattern. Scanning a light beam over a specific section of the document will modulate the light to provide an individual characteristic pattern identifying the document. As the pattern is repeatable, it has been proposed to record select data from the pattern on the document to enable future verification. Accordingly, such documents have been used as authenticators to verify various objects including merchandise.

Processing authentication documents as described above has generally involved machine operations to sense the identifying physical characteristic of the document itself, then reading the reference data for select comparison. Pursuing the above example, the translucency pattern of a paper document would be sensed for comparison with a machine-readable record of the pattern that is printed on the label. Such techniques have proven to be quite successful in combating counterfeits.

With respect to authentication documents as explained above, the printed data is sometimes called an "escort memory". Normally, the escort memory records data to indicate specific samples of the characteristic pattern sensed from the media. Accordingly, the data might specify a set of samples manifesting specific locations in the data section along with translucency values at such locations. In addition to an escort memory, the document also includes some form of reference for locating the data section. For example, the section might be located by an edge of the document or a printed reference target.

Considering an effective authentication system of the prior art, an optical target is printed on a document for use as a position reference. That is, the target defines a section of the document that is to be sensed for a repeatable characteristic pattern.

In operation, the section is sensed to produce signal-represented data that is individual to the document. The data is processed as by a data compression algorithm to produce a character string that identifies select locations of the section and the document character at such locations. The character string is then printed on the document in a machine readable form as the escort memory.

To authenticate the document the machine-readable characters (escort memory) are read and the target-designated section of the document is sensed. The two forms of data are then compared to test the recently observed character of the document with the recorded character. Of course, a favorable comparison verifies the document.

While systems of the prior art, as considered above, have been effective, certain limitations and disadvantages exist in relation to the escort memory. First, optical code readers (alphanumeric) are relatively expensive with the consequence that verification equipment is necessarily expensive. Second, an escort memory in the form of printed characters requires substantial space on the document. Expressed in another way, the information bit density for a printed escort memory is relatively low. As a third factor for reliable operation of an optical code reader, an escort memory in the form of optical characters requires a high quality printing.

An alternative encoding approach has been proposed for an escort memory in the form of bar codes. However, that alternative affords little advantage with respect to space requirements and the printing quality for a bar code reader must be comparable or perhaps even better than that required for an optical code reader. Thus, bar codes for the escort memory offer little advantage.

In the final analysis, a need continues to exist for an improved authentication device with the reliability of prior devices yet offering improvement with respect to the above considerations.

In general, the present invention includes an authentication device constituted by a sheet of medium including a characteristic section capable of individually identifying the device, e.g. as by light translucency. The characteristic section is marked or specified by a magnetic-ink mark (target) on the sheet of medium, the mark being of a shape and form to precisely locate the section. Additionally, the magnetic-ink mark is magnetized to indicate selected locations in the characteristic section and related values of the characteristic at such locations. Accordingly the target performs the joint function of specifying the characteristic section and providing the escort. The invention further includes the systems of producing and verifying such authentication devices.

As disclosed in detail below, the development hereof may be variously implemented using different media, different ink compositions, and different recording techniques. For example, the media may comprise paper with varying translucency or various other sheet media with an individual repeatable characteristic.

BRIEF DESCRIPTION OF THE DRAWINGS

In the drawings, which constitute a part of this specification, exemplary embodiments of the invention are set forth as follows.

DESCRIPTION OF THE ILLUSTRATIVE EMBODIMENTS

As indicated above, detailed illustrative embodiments of the present invention are disclosed herein. However, physical identification media, data formats, and operating systems structured in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiment for purposes of disclosure and to afford a basis for the claims herein which define the scope of the present invention.

Figure 1:
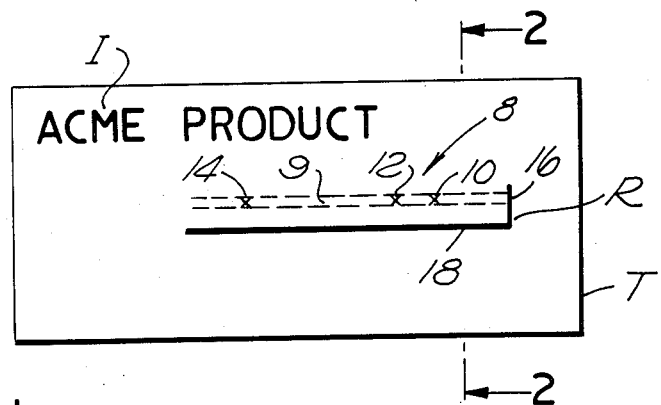
FIG. 1 is a plan view of an authenticator document in tag form and in accordance with the present invention illustrated for use in association with a product.

Referring initially to FIG. 1, a document is illustrated in the form of a product tag T bearing separately printed product indicia I and a target reference mark R. While only the indicia I and the reference mark R are visible, the tag T is shown with other markings illustrated to designate specific characteristic data locations as explained below.

A section 8 of the tag T is specified by extensions of the reference mark R. A scansion line 9 in the section 8 traverses a multitude of locations, three of which are designated as locations 10, 12, and 14.

In essence, the physical characteristic (translucency) of the tag T is sensed along the line 9 to provide specific repeatable data representative of the translucency at the locations 10, 12, and 14. Such data along with data specifying the locations 10, 12, and 14 is magnetically recorded in the reference mark R. Consequently, in a defined and relatively small space on the tag T the characteristic is specified and recorded. The tag T may be tested by sensing the character at locations 10, 12, and 14 and comparing the resulting data with the data magnetically sensed from the reference mark R. Accordingly, an economical, effective, reliable, and space-conservative authentication device is provided for use in a variety of applications.

Figure 2:
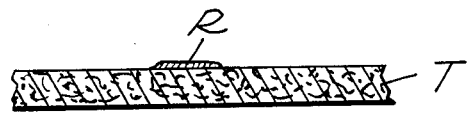
FIG. 2 is a fragmentary sectional view taken along line 2—2 of FIG. 1.

Considering the tag T in somewhat greater detail, the medium of the illustrative embodiment is a fibrous composition, e.g. bond paper, as illustrated in FIG. 2. The varying translucency characteristic of paper is inherent in the medium and may be observed simply by viewing a sheet of bond paper held before a bright light. That exercise will reveal a veriegated translucency pattern which is the identifying characteristic of the tag T. The reference mark R comprises magnetic ink as well known in the art.

Physically, the reference mark R has an L-shape configuration including a short vertical leg 16 and an elongate horizontal extension 18. Thus, the space or section 8 is defined horizontally by the extension 18 and vertically by the leg 16.

Normally, the tag T will be machine read from right to left. In that regard, the vertical leg 16 is detected somewhat as a leading edge. Thereafter, the extension 18 provides a base line to specify the section 8 as to an array of photosensors.

While the reference mark R optically specifies the space or section 8, the magnetic record in the extension 18 of the mark R specifies the precise positions of locations 10, 12, and 14 as well as the recorded translucency data for such locations. In that regard, as indicated above, the reference mark R (FIG. 2) may constitute an oxide-containing ink which is capable of recording data in the form of durable magnetic variations. Thus, the reference mark R functions optically and magnetically to designate the section 8, to specify selected locations 10, 12, and 14 in the section 8 and to indicate the translucency character data for the selected locations.

To consider the tag T in still greater detail, reference will now be made to FIG. 3 wherein structure and data are diagrammatically represented for coordination. The scansion line 9 is represented with a shaded density indication 20 to illustrate the varying translucency of the medium. That is, the shading indication 20 is merely a graphic representation of the translucency characteristic along the scansion line 9. For example, at the location 10 where the paper is quite translucent, the shading indication 20 is representatively narrow.

The length of the scansion line 9 is dissected into locations of spacing B, which are derived from the self-clocking magnetic record of the extension 18. Specifically, the equal spacing B is illustrated in FIG. 3. The representative spacing B, as sensed from the extension 18 in the form of electrical impulses is time sequenced in direct relationship to the physical spacing as illustrated in FIG. 3. Accordingly, the spacing B fragments the line 9 into locations as the location 10.

Below the scansion line 9 in FIG. 3 a waveform 24 is shown, representing the analog of the translucency along the line 9 as represented by the shading 20. Thus, the shading indication 20 indicates maximum translucency at a point 26, and such maximum translucency is reflected as a peak 28 in the waveform 24. In essence, the waveform 24 represents an analog signal, photoelectrically sensed from the scansion line 9. Digital data for correlating the waveform 24 to specific locations and comparative values is derived by magnetically sensing the extension 18 as represented in enlarged form below the waveform 24 in FIG. 3. Along its length, the extension 18 is segmented into locations coinciding to hexadecimal characters. The cells 30 (spacing B) are defined by clock signals developed from the magnetic recording format of the extension 18.

As indicated above, the tag T is normally read by a scanning operation moving across the tag from right to left. Considering the diagrammatic representations of FIG. 3 in that fashion, it is to be noted that optically sensing the line 8 produces an electrical signal as represented by the waveform 24 indicative of the translucency. The select data of the waveform 24 that is to be recorded and subsequently used for comparison, is specified by the data magnetically recorded in the extension 18. Of course, a wide variety of recording formats may be employed in the extension 18. In that regard, the illustrative format herein involves a rather simple embodiment to facilitate the present explanation.

To designate the location 10, the magnetically recorded extension 18 carries a specific symbol # recorded in the data cell 30a. Consequently, the next following data cell 30b is specified to be aligned with the location 10 and also records a scale-of-ten value (eight) for the translucency at the location 10. Thus, the symbol # in a cell 30 commands that the following cell 30 aligns with a select data location along the line 9 and accordingly gates a sample of the signal represented by the waveform 24.

Recapitulating to some extent, the reference mark R (FIG. 1) including the upright leg 16 and the horizontal extension 18 is optically sensed to define the section S of the tag T which exhibits the characteristic of concern. Furthermore, the extension 18 defines a relative position for the scansion line 9 defining select locations. Such select locations (actually signal sample points) are specified by the magnetic record of the extension 18 which also specifies the characteristic data at such select locations. Accordingly, the reference R affords a composite reference for authenticating the tag T.

Figure 4:
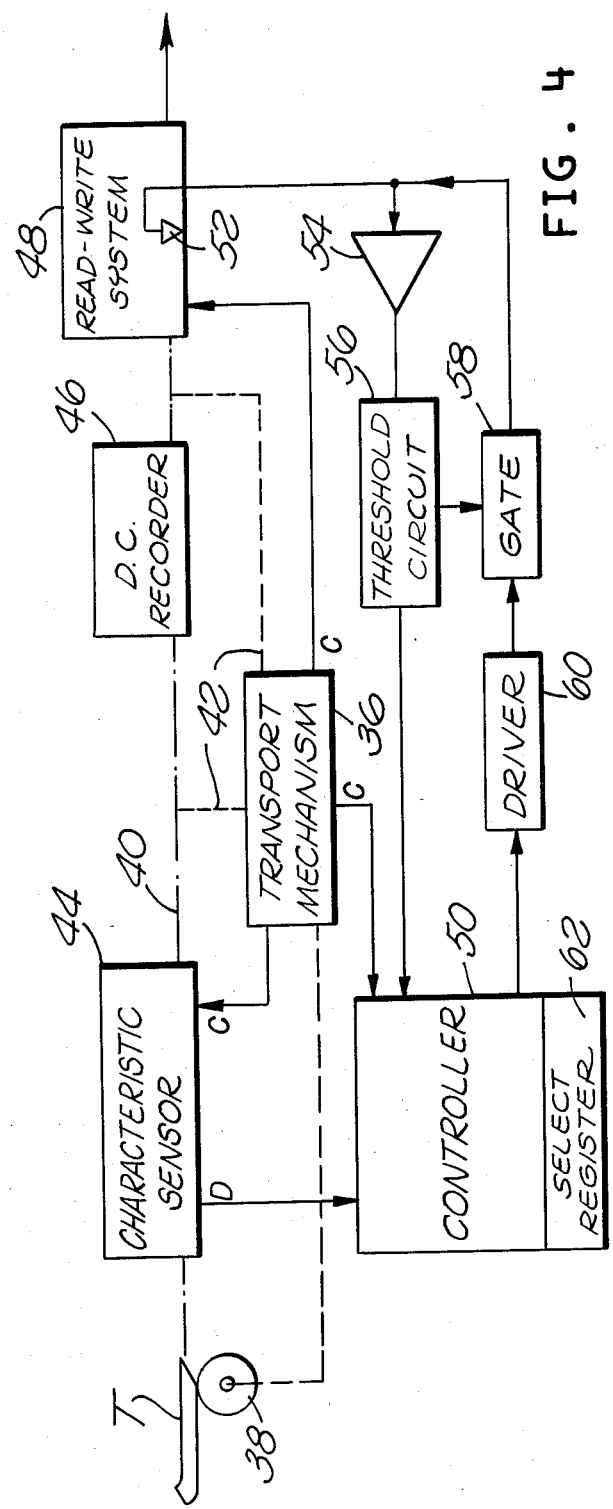
FIG. 4 is a block and schematic diagram of a system for producing documents as represented in FIG. 1.

To consider the production of an exemplary tag T, reference will now be made to FIG. 4 in which a tag T is symbolically represented (upper left). As illustrated in FIG. 4, the tag T carries the reference mark R, however, the mark R is unrecorded.

The unrecorded tag T (FIG. 4) is carried through sensing and recording operations by a transport mechanism 36 incorporating a plurality of guides and rollers, e.g. roller 38. Forms of such mechanisms are well known and widely used in the prior art.

The transport mechanism 36 is symbolically represented with respect to a document path for tag T as illustrated by a broken line 40. Dashed lines 42 symbolically indicate mechanical relationships between the transport mechanism 36 and the roller 38 as well as other elements (not shown). Note that the path is designated by the broken line 40.

The transport mechanism 36, with its mechanisms as represented in FIG. 4, carries a tag T (in a sequence of many) through a series of operational equipment. Specifically, the tag T first passes through a characteristic sensor 44, then moves through a D.C. recorder 46 and a magnetic read-write system 48. The sensor 44 measures the identifying characteristic of the tag T, e.g. translucency along the scansion line 9. The tag T emerges from the read-write system 48 in a completed form as described above with reference to FIG. 1 having the extension 18 magnetically recorded with the sensed characteristic.

Figure 3:
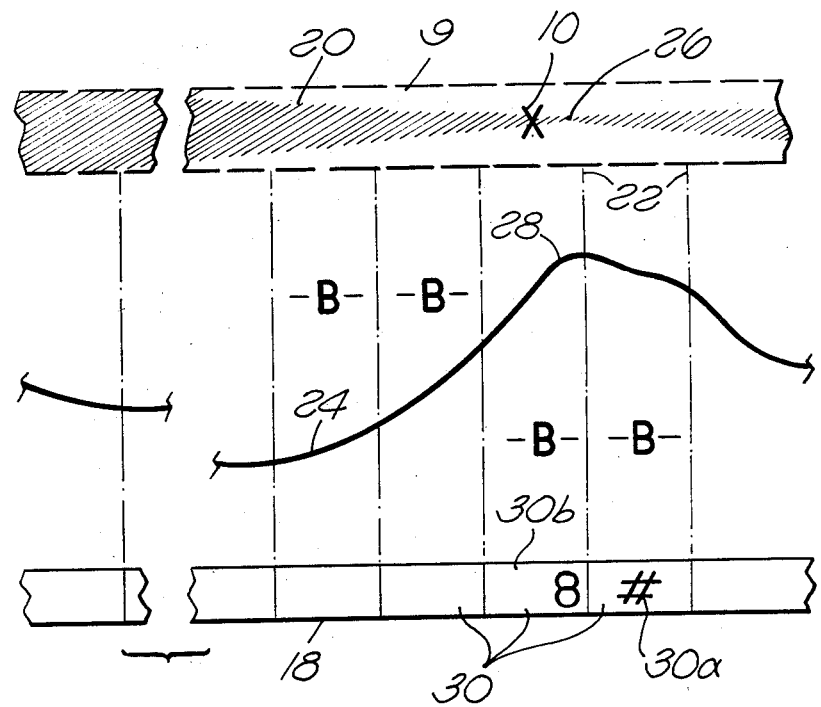
FIG. 3 is a diagrammatic representation illustrative of the operation of producing and processing the document of FIG. 1.

In addition to transporting the tag T, the transport mechanism 36 also provides clock pulses for developing the spacing relationship illustrated in FIG. 3. Essentially, the mechanism 36 is a constant-speed apparatus and provides time sequenced clock pulses in accordance with well known techniques of the prior art. The clock pulses then synchronize the data and are in fact incorporated in the data as in a variety of digital records. In that regard, the transport mechanism 36 is electrically connected for supplying clock pulses to the characteristic sensor 44, the read-write system 48 and a controller 50. A predetermined set of clock pulses defines each of the intervals B as illustrated in FIG. 3.

The controller 50 (FIG. 4) sequences the operations and processes the data. Initially, during the first phase of operation for a tag T, the controller 50 receives signal representations of the characteristic data for which select samples indicate translucency values of the tag T. The samples are provided as reference data to be recorded in the extension 18 (FIG. 1) of the tag T by the read-write system 48 (FIG. 4). In that regard, the read-write system 48 incorporates a read/write head 52 which initially locates the extension 18 and subsequently records signals thereon.

In a write mode, the head 52 supplies a signal to an amplifier 54 which in turn drives a threshold circuit 56. Upon sensing signals above a threshold level, the threshold circuit 56 supplies a trigger signal to the controller 50 and to a gate 58 for passing data signals from the controller 50 through a driver 60 and the gate 58 to the read-write system 48.

In view of the above preliminary explanation of the system of FIG. 4, a detailed understanding thereof may now best be accomplished by assuming a cycle of operation and explaining the sequence of events occurring in such operation. Accordingly, assume that the tag T is to be sensed and recorded as illustrated in FIGS. 1 and 3. Of course, such a cyclic operation would normally be performed as one in a multitude; however, for purposes of explanation, a single recording operation will be considered.

The tag T (FIG. 4) is received in the characteristic sensor 44 in which the scansion line 9 is sensed. In that regard, the characteristic sensor 44 may take a form as disclosed in U.S. Pat. No. 4,423,415, R. N. Goldman, entitled Non-Counterfeitable Document System (Ser. No. 276,282). In accordance with the structure disclosed therein, the tag T is sensed to provide an analog signal which is sampled to provide discrete digital data indicative of individual locations of the line 9. The locations 10, 12, and 14 are determined by a count of clock pulses C initialled by sensing the leg 16.

In the exemplary operation under consideration, data to be magnetically recorded on the tag T is first assembled in a register 62 in the controller 50. Such data is developed in clock sequence preparatory to recording on the extension 18 of the tag T. Prior to an operating cycle, location-specifying symbols # are set in the register 62 to precede the desired locations for translucency data in clock sequence. In the specific example of tag T, the register 62 holds a representation of the symbol # at spaces that precede locations 10, 12, and 14 in the time-space relationship of clock pulses C.

As the character sensor 44 scans the scansion line 9 to produce a translucency analog (waveform 24, FIG. 3), space-synchronized clock pulses C are also produced to step the register 62. When a symbol # is reached in the register 62, a sampling period is indicated to follow. Accordingly, analog samples are taken at the locations 10, 12, and 14 to be digitized and set into the register 62 immediately following the symbols #. As illustrated in FIG. 3, following the first symbol # (cell 30a) a digital value of translucency is registered (cell 30b). Preliminary to magnetically recording the extension 18, the data format is thus composed in the register 62 for sequencing by clock pulses to cells 30. Such data for recording is completed at the time when the tag T emerges from the characteristic sensor 44.

The tag T next passes through the D.C. recorder 46 which sets a somewhat uniform magnetic orientation in the extension 18 preparatory to recording. Of course, a variety of forms of D.C. recorders are well known in the prior art and may simply consist of a coil for providing a concentrated magnetic field.

Leaving the D.C. recorder 46, the tag T is carried by the transport mechanism 36 to the read-write system 48 where the head 52 is aligned by an edge to sense the magnetic-ink extension 18. Initially, the head 52 operates in a read mode pending arrival of the reference mark R. Before the magnetic reference mark R reaches the head 52, the head senses only paper providing essentially a null signal. However, when the extension 18 (D.C. magnetized) moves under the head 52, a significant signal level is provided for amplification by the amplifier 54 and application to the threshold circuit 56. At that instant, the threshold circuit 56 provides a trigger signal to open the gate 58.

Again, the register 62 is driven by clock pulses C from the transport mechanism 36 to step out binary-coded decimal signals as the magnetic recording format for the extension 18. Such clocked signals are synchronized with the locations and cells (FIG. 3) of the tag T. The register 62 provides signals representative of the symbol # for the cell 30a (indicating that the following segment carries an amplitude indication). Immediately following signals for the symbol, signals are provided representing a decimal eight to be recorded in the segment 30b. Accordingly, the length of the extension 18 is recorded with position data manifest by the # and translucency data manifest by a number from one to nine. A completed tag, as the tag T of FIG. 1, is thus provided from the read-write system 48 sensed and recorded.

After production, a tag or other document, may be employed in a wide variety of applications. For example, as suggested above, the tag T may be attached to merchandise for verifying that such merchandise is not a counterfeit. Of course, various other uses for authentication documents are well recognized and are likely to evolve in the future.

Figure 5:
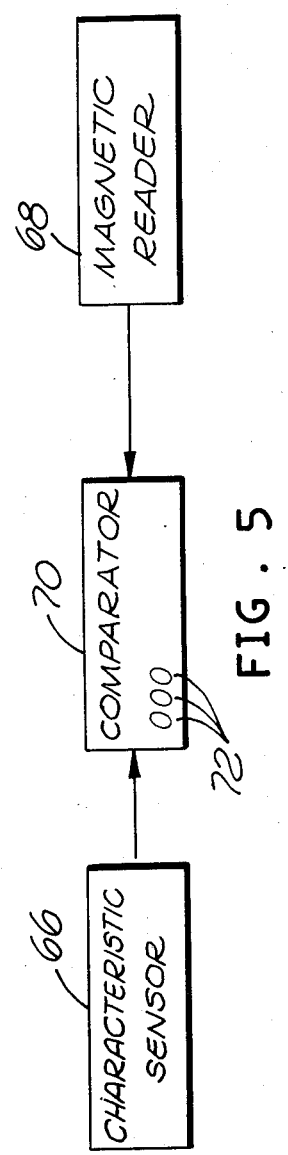
FIG. 5 is a block diagram of a system for testing documents as illustrated in FIG. 1.

Should the authenticity of the tag T, as disclosed above, be questioned, it is simply necessary to again sense the characteristic of the tag, read the magnetic data to select the pertinent characteristic data, then compare the freshly sensed characteristic data with the magnetically recorded data. The structure for performing such a test operation may take a form as represented in FIG. 5 and simply include a characteristic sensor 66 (as described above) along with a magnetic reader 68, both of which supply signals to a comparator 70. Signal apparatus, as for example signal lamps 72, may be incorporated in the comparator 70 to indicate a degree of coincidence in the comparison of the reference data and the freshly sensed data.

It will be readily appreciated from the above illustrative embodiments that the system hereof is susceptible of a great number of modifications and deviations within the basic conceptual framework of providing a tag with a characteristic that may be repeatedly sensed and a reference mark element in optical-magnetic form for locating the characteristic areas and indicating standards for comparison. Accordingly, the scope hereof is deemed to be as set forth in the claims below.

What is claimed is:

1. An authenticator device as for verifying authenticity comprising:

a sheet (T) of medium including a section (8) that exhibits an optically sensible characteristic of distinction to identify the authentication device; and a magnetic-ink mark (R) on said sheet of medium including an elongate extension (18), said mark (18) being of a shape to optically specify boundaries of a predetermined portion of said section (8) on said sheet in the form of a scansion line (9) for optical sensing, said mark (R) further being selectively magnetized to record signals representative of said characteristic in said scansion line (9) whereby to identify the authentication device.

2. An authenticator device according to claim 1 wherein said defined section comprises a fibrous material of inherent varying light transparency.

3. An authenticator device according to claim 2 wherein said defined section comprises paper of inherent varying light transparency.

4. An authenticator device according to claim 1 wherein said mark is selectively magnetized to record specific locations of said defined portion, which locations provide said signals representative of said characteristic.

5. An authenticator device according to claim 4 wherein said mark is selectively magnetized at data cells therein that are physically positioned to indicate said specific locations, said data cells registering said signals representative of said characteristic at designated specific locations.

6. An authenticator device according to claim 1 wherein said section of said sheet modulates light impinging thereon to manifest said characteristic of distinction at one or more specific locations.

7. An authenticator device according to claim 6 wherein said specific locations are registered by the location of magnetic signals recorded by said mark.

8. An authenticator device according to claim 1 wherein said mark comprises extensions in horizontal-vertical offset relationship to define said portion of said section as an area.

* * * * *